Nov. 3, 1959   A. WINKLER ET AL   2,910,925
FOCUSING MECHANISM FOR PHOTOGRAPHIC CAMERAS
Filed Nov. 25, 1953
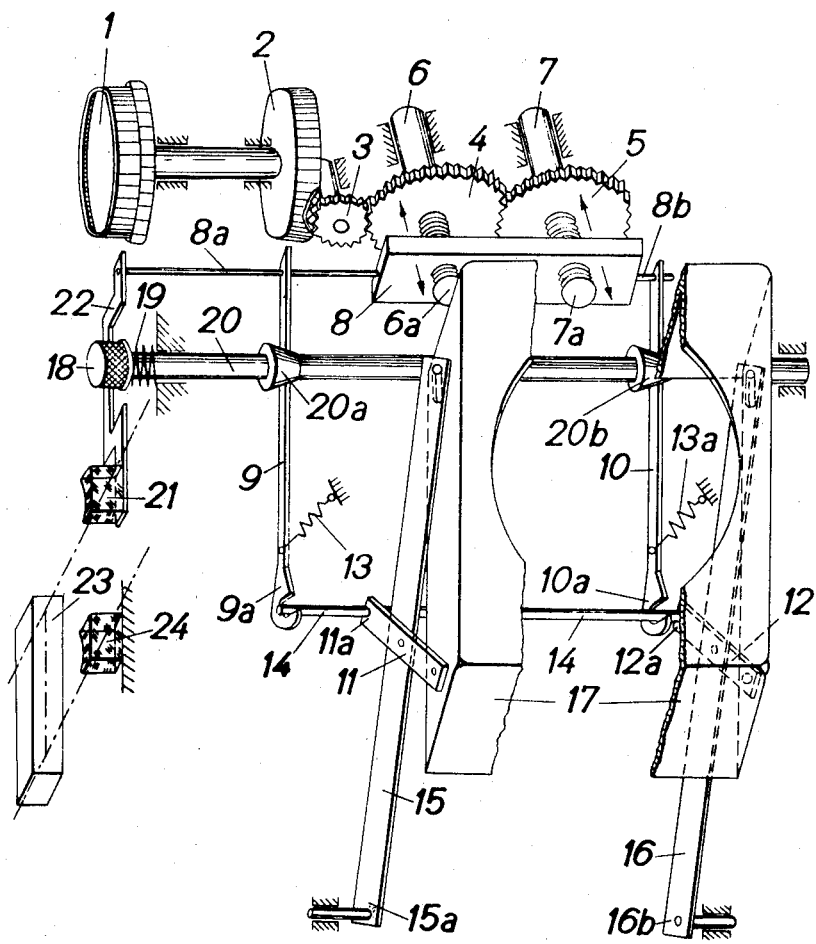
INVENTORS
ALFRED WINKLER and
WILLY KADEN
By  *Connolly & Hutz*
THEIR ATTORNEYS United States Patent Office 2,910,925
Patented Nov. 3, 1959

2,910,925

FOCUSING MECHANISM FOR PHOTOGRAPHIC CAMERAS

Alfred Winkler and Willy Kaden, Munich, Germany, assignors to AGFA Aktiengesellschaft, Leverkusen-Bayerwerk, Germany, a corporation of Germany Application November 25, 1953, Serial No. 394,463

Claims priority, application Germany December 4, 1952

5 Claims. (Cl. 95—45)

This invention relates to focusing mechanism for photographic cameras. More particularly, the invention relates to an improved mounting and adjusting structure for the lens carrier of such type cameras.

A well-known and common practice in conventional photographic cameras is the provision of a strut or lazy tongs linkage for supporting and adjusting the lens for focus control. Such structures usually employ a pair of lazy tongs connected at one end to the lens carrier and at the other end to a drive mechanism which effects the desired adjustment. These prior arrangements, however, have not proven satisfactory in operation in being unnecessarily bulky, expensive and difficult to service. In particular, prior focusing support structures have failed to provide the desired degree of ruggedness and stability in the constant adjusting operations necessary for focus control.

Accordingly, it is a purpose of the present invention to provide an exceptionally stable focus control structure for photographic cameras. A particular object of the invention is the provision of a simplified structure for focusing photographic cameras by a single unitary structure connected to the ends of a strut or lazy tongs linkage. Another object of the invention is the provision of a backlash free, geared drive mechanism for the focus control. Yet another object is the provision of a focusing structure having component control parts operating in a single plane to reduce unbalanced moments and stresses. These and other objects will become apparent from the following description and claims.

The invention may be broadly described as comprising a rotary to reciprocating control movement in which the adjusting movements of a focus control knob in one plane are translated into reciprocation of the lens carrier in a second, perpendicular plane. More specifically, the invention employs a gear drive to two parallel screw shafts cooperating with a reciprocable plate which is disconnectably coupled to the ends of a pair of struts in a lazy tongs linkage on the lens carrier. In cases where the lens carrier is coupled with the telemeter, the reciprocable plate is connected with the usual adjusting device of the telemeter on the one hand, and, on the other hand, with the ends of the struts forming part of the lazy tongs linkage. Preferably, the disconnectable coupling between the plate and the struts comprises a simple pin and slot joint.

Having generally disclosed the invention, reference will now be made to the accompanying drawings in describing a preferred embodiment thereof, and in which the single figure illustrates a schematic view of the interior of a camera employing a simplified form of focus control mechanism.

As shown, the mechanism comprises a rotatable control knob 1 which can project through the side of the camera and which is fixedly mounted on a shaft carrying a crown gear 2. Gear 2 meshes with a second gear 3 which in turn drives a gear train 4, 5. The gears 4 and 5 are fixedly mounted on a pair of parallel shafts 6 and 7 supported in the end wall of the camera casing and include screw threaded extensions 6a and 7a, respectively. The threaded extensions 6a and 7a in turn mate with cooperating threaded openings in a plate member 8 which is thus adapted to be reciprocated in the directions of the arrows by rotation of knob 1.

The respective ends of plate 8 carry projecting pivot pins or axles 8a, 8b, which respectively pivotally support a pair of spaced arms 9 and 10. Each arm includes an enlarged slot supporting protuberance 9a, 10a, at its free end for cooperation with a cross bar 14 carried by the lower ends 11a, 12a of a pair of lazy tong arms 11 and 12. The arms 9 and 10 are normally resiliently urged upwardly to bring the slots in 9a, 10a into engagement with bar 14 by means of springs 13, 13a. If desired, the pivot pins 8a, 8b may be fixedly connected to the respective coupling arms 9 and 10 and supported for rotation in plate 8 by suitable bearings.

The struts or arms 11, 12 form part of a pair of spaced lazy tongs linkages for supporting and moving a lens carrier 17 which is fixedly connected to the upper end of the struts. The second struts or arms, 15 and 16, of the respective lazy tongs are permanently pivotally mounted on the camera casing by means of pins 15a and 16a at one end and at the other end are connected to the lens carrier by pin and slot connections. This latter mounting provides a necessary lost motion type coupling to accommodate arcuate movement of struts 15 and 16 with linear movement of carrier 17.

As will be understood by an inspection of the drawings, the arrangement is such that rotation of knob 1 will transmit rotary motion through the gear train 2 to 5 inclusive to rotate screw shafts 6a, 7a. This in turn will cause reciprocation of plate member 8. Movement of plate 8 in the direction of the arrows is transmitted to the lens carrier 17 by reason of the spaced arms 9 and 10 which are normally adapted to receive the cross bar 14, of struts 11 and 12 in the slotted end thereof. Thus, movement of arms 9 and 10 in the plane of the paper will serve to pivot the lower ends 11a, 12a of the respective lazy tongs linkage to extend or retract carrier 17 in a plane which is substantially perpendicular to the paper to provide the desired focusing adjustment. A particular feature of the present construction is the locating of the manual control and transfer mechanism 1 through 14 inclusive so that all component parts operate in parallel planes. Because of this, unbalanced turning moments, and bearing stresses, are eliminated and an exceptionally stable structure results. In this respect, it will be noted that the operating screw shafts 6a and 7a comprise part of a directly connected gear train in which substantially all lost motion or backlash may be eliminated. Further, screw shafts 6a and 7a are adapted to rotate in opposite directions and for this reason bear treads of opposite hands (i.e., right and left hand). This latter arrangement has proved very effective in stabilizing the reciprocating plate 8 and in further obviating free play and backlash.

As will be readily understood, the lens carrier 17 is normally adapted to project from the camera casing during operative use but should be adapted to be retracted within the casing when in non-use, as for example, during storage. To facilitate such action, the present control mechanism includes a reciprocating push rod 20, having a manually engageable knob 18, which is positioned transversely of arms 9 and 10 and adapted to reciprocate in the direction which is substantially perpendicular to the direction of movement of such arms. Push rod 20 is normally urged to a left-hand limit position as illustrated in the figure by means of a spring member 19 interposed between the enlarged knob 18 and a fixed portion of the camera casing, knob 18 being adapted to project through the side of the casing directly beneath the control knob.

The push rod carries a pair of spaced truncated cam members 20a, 20b located adjacent the respective arms 9 and 10 and which are adapted upon depression of the push rod against the biasing action of spring 19 to frictionally contact the respective arms to cause the same to pivot on pins 8a and 8b against the action of holding springs 13 and 13a. This operation serves to disengage the slotted ends 9a, 10a of the respective arms from the cross bar 14 and facilitates the ready retraction of carrier 17 into the camera casing, the control ends 11a, 12a and cross bar 14 of the lazy tongs linkage moving angularly upwardly as viewed in the figure to a position spaced from arms 9 and 10. This arrangement provides an exceedingly rugged and flexible disconnect coupling in which the component parts are readily positioned so as not to interfere with the conventional camera shutter, lens, and diaphragm structure.

In the embodiment of the invention illustrated, it is possible to couple the focusing mechanism with a telemeter for the purpose of automatically focusing the two in a known manner. For this purpose, the pin 8a of plate 8 is extended to the side of the camera casing and rigidly carries a support plate or arm 22 mounting a lens 21 at its free end. Lens 21 in turn forms the means of deviating the measuring rays of the telemeter system while the other parts of the system are formed by a prism 23 in connection with a lens 24, both being fixedly mounted in the camera casing. The plate 8 therefore is connected with the usual adjusting device of the telemeter on the one hand and, on the other hand, with the ends of the struts forming parts of the lazy tong linkage in the camera casing. The arrangement is such that selective rotation of knob 1 to reciprocate plate 8 and thereby to extend or retract carrier 17 will in turn displace lens 21 in the direction of movement of plate 8 to effect a predetermined ray diversion in the telemetering system.

Although the invention has been described as employing a multiple component gear train for actuating control plate 8, it will be readily understood that the control knob 1 can, if desired, be connected with the simplified gear train, as for example, a worm which engages a worm wheel rotatably mounted on a single shaft and including internal threads for cooperating with male threads on such shaft, the shaft in turn being fixedly connected to plate 8 and adapted to reciprocate upon rotation of the worm wheel to move plate 8 forwardly and backwardly as desired. In such case, it is preferred that the mounting shaft extension include a keyed, squared, or otherwise configurated extension which can be suitably supported in the camera casing so as to prevent rotation of the shaft. The driven worm wheel may also be supported in a suitable recessed area in the casing wall in concentric relationship with the extension of the operating shaft. Alternatively, gear members 4 and 5 may comprise independent, non-meshing, spaced worm wheels which can be adapted to be simultaneously rotated by a pair of mating worms carried by a single shaft connected to knob 1, the worms being of opposite lead.

As many apparently widely different embodiments of this invention may be made without departing from the spirit and scope hereof, it is to be understood that this invention is not limited, except as defined in the appended claims.

What is claimed is:

1. A focusing mechanism for a photographic camera including a lens carrier supported for a movement towards and away from said camera by means of an extension linkage including two pairs of pivoted struts moving in parallel planes, said mechanism comprising a plate, a pair of parallel screw shafts threaded into said plate for moving said plate in a direction parallel to said parallel planes of movement of said pairs of struts, a gear secured to each of said parallel shafts, said gears being meshed with each other, a single manually operable control element operatively engaged with one of said gears and adapted to thereby initiate said movement of said plate, a pin connected to said plate with its axis disposed parallel to the plane of said plate, a pair of rods rotatably mounted upon said pin, said rods including open-slotted ends connected with one strut of each of said pairs of pivoted struts for transmitting movement of said plate to said lens carrier, resilient means reacting with said rods in a direction urging them into contact with said struts, and camming means operatively associated with said rods and including a manually actuable member for permitting the open slots of said rods to be conveniently disconnected from said struts to allow said extension means including said pivoted struts to be retracted.

2. A focusing mechanism as set forth in claim 1 wherein said one strut of each of said pairs of pivoted struts is connected to a cross bar, and said resilient means urges said rod into contact with said cross bar.

3. A focusing mechanism as set forth in claim 2 wherein said camming means includes a reciprocally mounted push rod including a pair of cam elements, and said cam elements being disposed adjacent said rods for optionally bearing against said rods in response to a reciprocating movement of said push rod for overcoming the reaction of said resilient means to disengage said open slots of said rods from said cross bar.

4. A focusing mechanism as set forth in claim 1 in which said camera includes a telemetering system having at least one movable optical component, and said plate is connected to said movable optical component.

5. A focusing mechanism as set forth in claim 4 wherein said movable optical component is mounted upon an arm and said arm is connected to said plate through an extension of said pin.

References Cited in the file of this patent

UNITED STATES PATENTS

| | | |
|---|---|---|
| 598,569 | Meyer | Feb. 8, 1898 |
| 1,883,798 | King | Oct. 18, 1932 |
| 2,045,037 | Lingg et al. | June 23, 1936 |
| 2,113,319 | Crumrine | Apr. 5, 1938 |
| 2,305,301 | Maniya | Dec. 15, 1942 |

FOREIGN PATENTS

| | | |
|---|---|---|
| 118,179 | Germany | Mar. 7, 1901 |
| 179,677 | Germany | Dec. 13, 1906 |
| 594,064 | Germany | Mar. 9, 1934 |
| 646,906 | Germany | June 23, 1937 |